United States Patent
Husted

(10) Patent No.: US 8,594,150 B1
(45) Date of Patent: Nov. 26, 2013

(54) DUAL ADAPTIVE FREQUENCY HOPPING SYSTEM AND METHOD

(75) Inventor: Paul J. Husted, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 775 days.

(21) Appl. No.: 12/651,871

(22) Filed: Jan. 4, 2010

(51) Int. Cl.
*H04B 1/69* (2011.01)
*H04B 1/713* (2011.01)

(52) U.S. Cl.
USPC ............ 375/132; 375/133; 375/135; 375/232

(58) Field of Classification Search
USPC .......................................... 375/133, 141, 144
See application file for complete search history.

(56) References Cited

U.S. PATENT DOCUMENTS

| | | | |
|---|---|---|---|
| 5,610,839 A * | 3/1997 | Karolak et al. ............... | 455/450 |
| 8,095,131 B2 * | 1/2012 | Yacono ......................... | 455/434 |
| 2002/0116460 A1 * | 8/2002 | Treister et al. ................ | 709/204 |
| 2006/0078039 A1 * | 4/2006 | Dhar et al. .................... | 375/132 |
| 2007/0066227 A1 * | 3/2007 | Duerdodt et al. ............. | 455/63.1 |
| 2008/0045152 A1 * | 2/2008 | Boes ............................. | 455/63.1 |
| 2009/0258607 A1 * | 10/2009 | Beninghaus et al. .......... | 455/77 |
| 2010/0322287 A1 * | 12/2010 | Truong et al. ................ | 375/133 |
| 2011/0009060 A1 * | 1/2011 | Hsu et al. ..................... | 455/41.2 |

* cited by examiner

*Primary Examiner* — Qutbuddin Ghulamali
(74) *Attorney, Agent, or Firm* — DeLizio Gilliam, PLLC

(57) ABSTRACT

An adaptive frequency hopping system and method uses two separate channel masks in an electronic device with collocated frequency hopping and single frequency systems to permit simultaneous transmissions by both systems without reducing a rate of data communication through the single frequency system. A first channel mask, corresponding to a transmission mask, and a second channel mask, corresponding to a reception mask, are separated from a carrier frequency used by the single frequency system, and optionally from two different carrier frequencies used by two different single frequency systems, by a selected magnitude of frequency difference. The selected magnitude of frequency difference may optionally be reduced to permit a channel mask to contain a minimum selected number of frequency hopping channels.

14 Claims, 8 Drawing Sheets

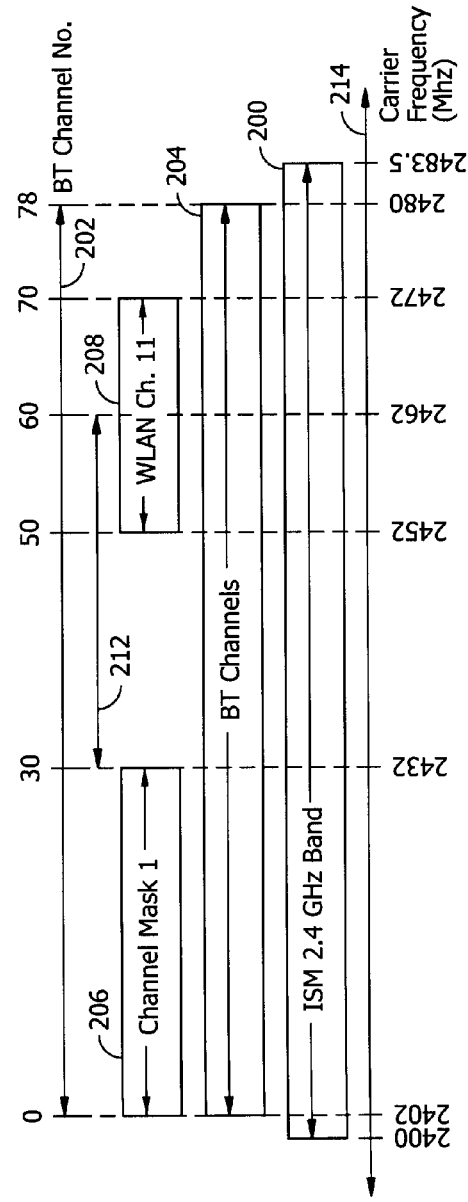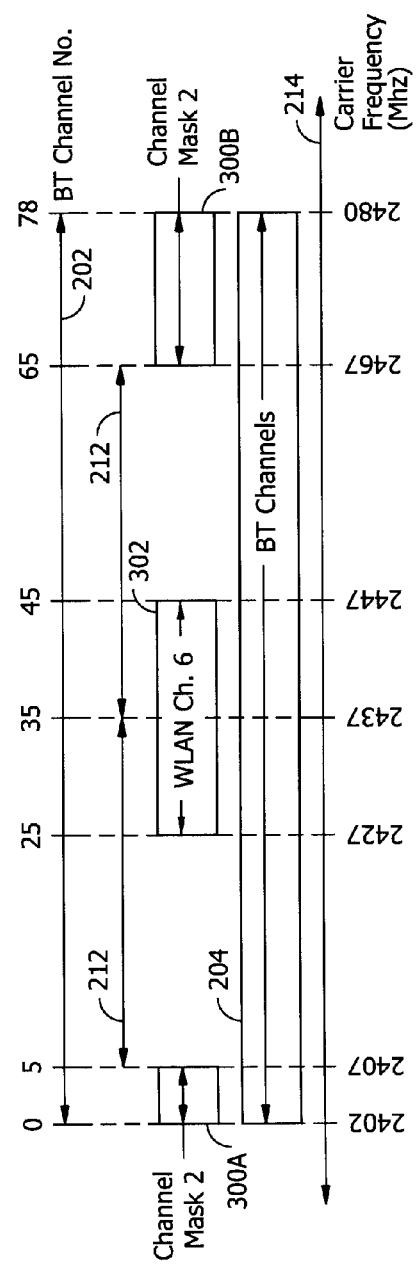

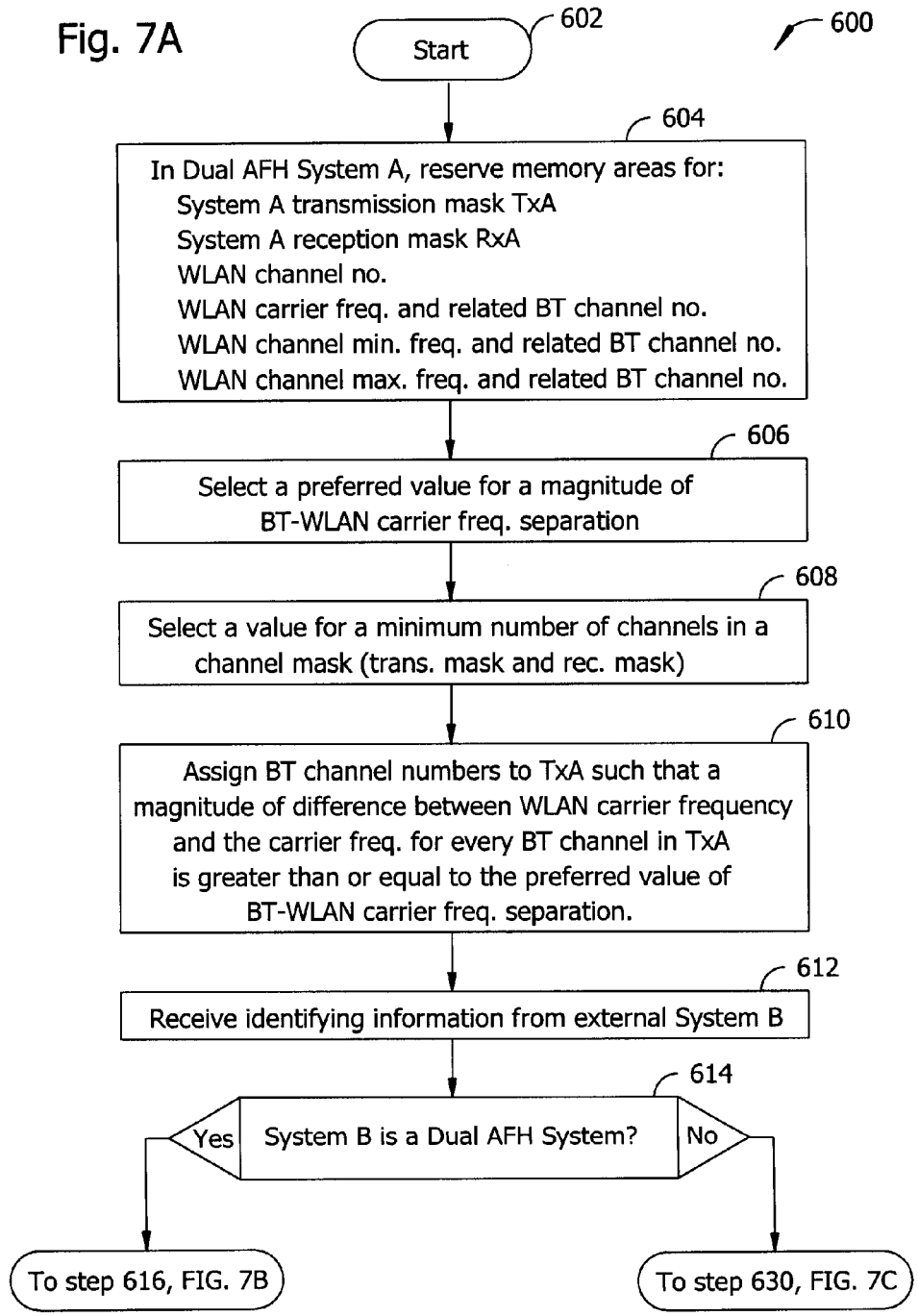

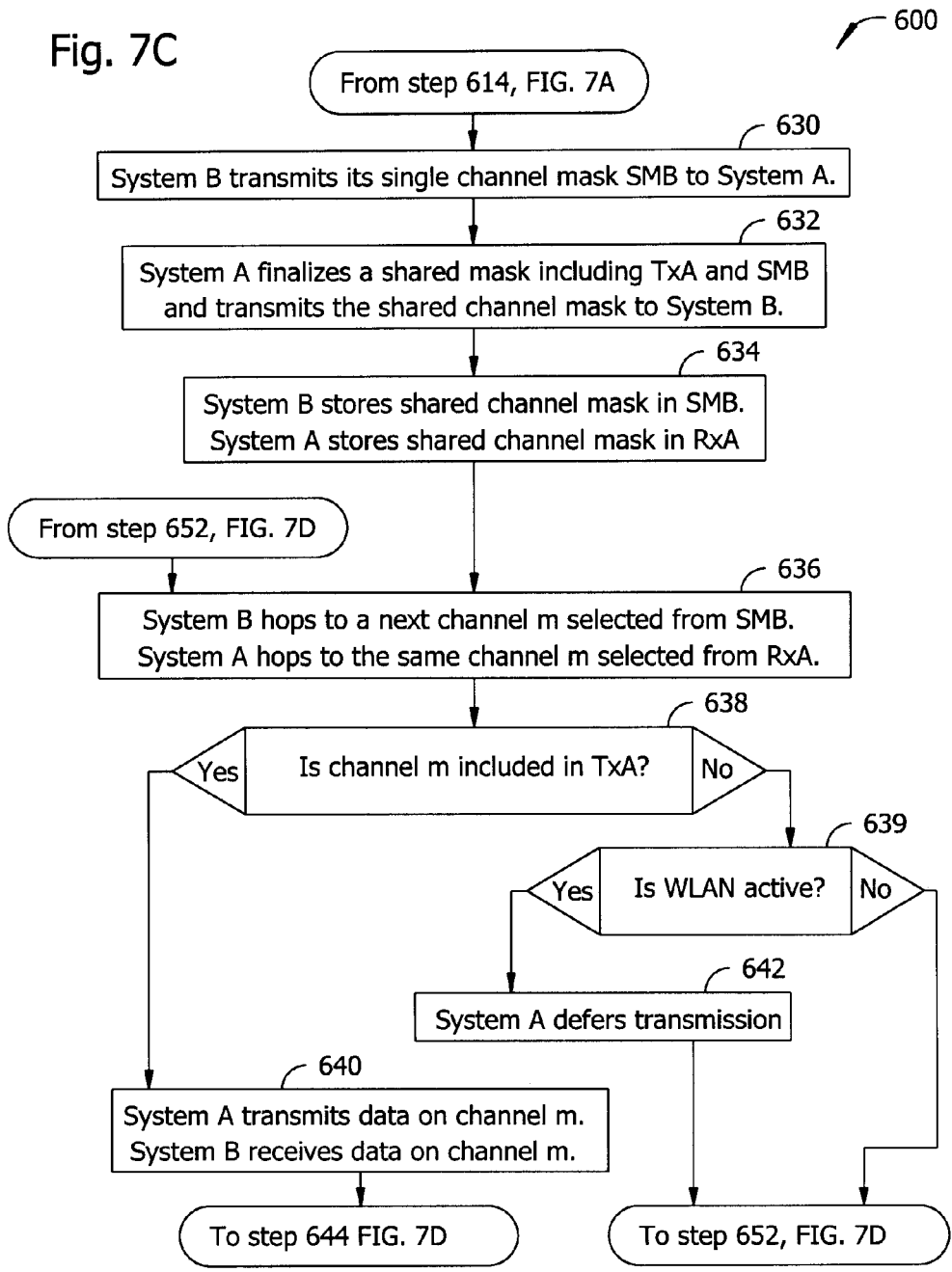

DUAL ADAPTIVE FREQUENCY HOPPING SYSTEM AND METHOD

FIELD OF THE INVENTION

Embodiments of the invention relate generally to wireless digital communications and more specifically to a system and method for frequency hopping in devices with collocated frequency hopping and single frequency radio transceivers.

BACKGROUND

Electronic devices such as personal computers, laptops, cell phones, personal digital assistants, headsets, game systems, and cameras may be equipped with one or more radio transceivers for wireless exchange of information. A radio transceiver may use a method known as frequency hopping to reduce interference with other electronic devices by changing from one carrier frequency to another during a transmission. A frequency hopping transceiver transmits a related group of data packets over many carrier frequencies selected from a list of radio frequencies referred to as a channel mask. The list of carrier frequencies in a channel mask is negotiated between a transmitting electronic device and a receiving electronic device so that both devices can exchange signals on a same carrier frequency at the same time. Frequency hopping transceivers known in the art, for example frequency hopping transceivers operating in accord with the Bluetooth open wireless communications protocol, each have a single channel mask for coordinating radio communications.

A carrier frequency included in a channel mask may also be referred to by a corresponding channel number. After a data packet is transmitted and successful receipt of the data packet is acknowledged, the frequency hopping transceiver in a transmitting electronic device changes to a next channel number selected from its channel mask, the receiving device changes to the same channel number as the transmitting electronic device, and another data packet is transmitted. The steps of selecting a channel number from the channel mask, transmitting a data packet on the selected channel number, receiving the data packet on the same channel number, and selecting a new channel number are repeated until all data packets in a data set have been successfully transmitted from the transmitting electronic device and received by the receiving electronic device.

Compared to a frequency hopping transceiver, which switches from one channel to another during transmission and reception of a data set, a single frequency radio transceiver transmits and receives data packets on a single carrier frequency. Single frequency transceivers are commonly used in electronic devices adapted for communicating over wireless local area networks. The carrier frequency used by a single frequency transceiver may be selected from a range of carrier frequencies specified in one of the protocols defined in IEEE 802.11, such as 802.11b, 802.11g, or 802.11n. Some electronic devices may include both a single frequency transceiver and a frequency hopping transceiver. For example, a game console having both a frequency hopping transceiver and a single frequency transceiver may transmit data packets related to sound effects, music, or speech to a headset equipped with a frequency hopping transceiver while simultaneously exchanging other data packets over a wireless local area network (WLAN) with a router having a single frequency transceiver.

Frequency hopping transceivers operating in accord with the Bluetooth open wireless communications protocol and single frequency transceivers operating in accord with IEEE 802.11 share a range of transmission and reception frequencies in the 2.4 gigahertz (GHz) Industrial, Scientific, and Medical (ISM) band. Radio frequency interference is likely to occur between collocated single frequency and frequency hopping transceivers known in the art. Interference between collocated single frequency and frequency hopping transceivers may cause some data transmitted over a WLAN to be retransmitted, resulting in a reduced rate of data communication over the WLAN. In some cases, WLAN communications may be severely disrupted, causing a loss in utility in an electronic device with collocated single frequency and frequency hopping transceivers.

Methods such as Adaptive Frequency Hopping (AFH) and Packet Traffic Arbitration have been used to reduce data communication errors in electronic devices with collocated radio transceivers. In AFH, a set of channel numbers corresponding to carrier frequencies available for transmission and reception of data packets is negotiated between a frequency hopping transceiver in a transmitting electronic device and a frequency hopping transceiver in a receiving electronic device. A set of negotiated channel numbers is referred to as a hop set, a channel mask, or an AFH mask. The channel numbers in an AFH mask may be chosen to leave a selected magnitude of frequency separation between the AFH mask and a blocking signal, for example a carrier frequency used by a single frequency transceiver such as a WLAN transceiver. Also, transmitting and receiving electronic devices using AFH to communicate with each other use a same method for selecting a sequence of channel numbers from a channel mask in each device so that both devices communicate over the same channel number at the same time.

Packet Traffic Arbitration (PTA) may reduce communication errors by providing means for deciding when a frequency hopping transceiver or a single frequency transceiver in an electronic device has access to shared radio resources. For example, PTA may give priority to the frequency hopping transceiver for some operations and to the single frequency transceiver for other operations. Reception of data packets by one collocated system may be prevented while the other collocated system is transmitting, so PTA may result in a reduction of the overall data transfer rate and may therefore be unacceptable for systems in which communications latency, especially latency in WLAN communications, is undesirable.

What is needed is a system and method for operating collocated single frequency and frequency hopping transceivers without reducing a rate of WLAN data communication. What is further needed is a system and method for operating collocated single frequency and frequency hopping transceivers without controlling access to shared radio resources by PTA.

SUMMARY

A system and a method for adaptive frequency hopping (AFH) in an electronic device with collocated single frequency and frequency hopping systems provides for a frequency hopping transceiver adapted to operate with at least two channel masks, including at least one transmission mask and at least one reception mask. An electronic device built in accord with an embodiment of the invention is able to communicate simultaneously through its frequency hopping and single frequency systems without reducing a rate of data communication through the single frequency system. A transmission mask includes a set of frequency hopping channels from which a channel is selected for wirelessly sending data from a transmitting electronic device to a receiving electronic device. A reception mask includes a set of frequency hopping channels from which a channel is selected for wirelessly sending data from the receiving electronic device back to the transmitting electronic device, for example data related to a channel number, acknowledgement message, or error condition. A transmitting electronic device and a receiving electronic device may optionally use channels selected from the transmission and receiving masks for bidirectional exchange of data. For example, the receiving electronic device may optionally send data traffic back to the transmitting electronic device. In a pair of electronic devices built in accord with an embodiment of the invention, a transmission mask in the transmitting electronic device and a reception mask in the receiving electronic device include a same set of frequency hopping channels. Furthermore, a reception mask in the transmitting electronic device and a transmitting mask in the receiving electronic device include a same set of frequency hopping channels.

The transmission mask and the reception mask each include a selected minimum number of frequency hopping channels. For two electronic devices communicating with each other by frequency hopping systems while simultaneously communicating by a single frequency system over a same WLAN channel, either with each other or with other devices, a magnitude of frequency separation between the WLAN channel and channels in each of the two channel masks is greater than or equal to a selected value. For two electronic devices communicating with each other by frequency hopping systems while communicating with other devices over two different WLAN channels, the magnitude of frequency separation between the carrier frequency of the WLAN channel and each of the two channel masks may be less than a preferred value, but is still a maximum value of separation that can be achieved while maintaining the selected minimum number of frequency hopping channels in each channel mask.

For some embodiments of the invention, the selected value of frequency difference is 30 MHz and the selected number of frequency hopping channels in each of the two channel masks is greater than or equal to 20. In other embodiments of the invention, other magnitudes of frequency difference and different numbers of frequency hopping channels in a channel mask may be used. Channels are optionally selected from a channel mask by conventional methods for selecting an AFH hop sequence. A data packet may optionally be transmitted or not transmitted according to a decision made by a controller and an arbiter circuit.

Some embodiments of the invention include a frequency hopping transceiver and a collocated single frequency transceiver. The frequency hopping transceiver comprises a frequency hopping radio having at least two channel masks, a transmission mask and a reception mask. The frequency hopping transceiver further includes a radio transmitter and a controller for managing transceiver hardware and for executing the steps of a method in accord with an embodiment of the invention. The frequency hopping transceiver may alternately share an antenna with the collocated single frequency transceiver or the two transceivers may have separate antennas. The controller in the frequency hopping radio may optionally monitor signals related to status of the single frequency transceiver, but the single frequency transceiver sends and receives data without regard to whether or not the frequency hopping radio is transmitting, thereby maintaining a rate of WLAN data communication that is not reduced by simultaneous operation of the frequency hopping system. Some embodiments of the invention include more than one pair of channel masks, each pair used for wireless communication with a separate external electronic device.

Some embodiments of the invention include a method for wirelessly transmitting data between two dual AFH systems. A method in accord with an embodiment of the invention optionally includes steps for deciding when a transmission may be made by the frequency hopping system and when a transmission by the frequency hopping system may be delayed.

This section summarizes some features of the embodiments of the invention. These and other features, aspects, and advantages will become better understood with regard to the following description and upon reference to the following drawings, wherein:

BRIEF DESCRIPTION OF THE DRAWINGS

FIG. 2 is a diagram showing frequency hopping channels, a first example of a channel mask, and WLAN channel 11, all in the ISM 2.4 GHz band, which may be used with an embodiment of the invention.

FIG. 3 is a diagram showing frequency hopping channels, a second example of a channel mask, and WLAN channel 6, which may be used with an embodiment of the invention.

FIGS. 7A-7D comprise a multipage flowchart of an example of steps in a method in accord with an embodiment of the invention.

DESCRIPTION

A dual adaptive frequency hopping method and system reduces radio frequency interference between radio transceivers in an electronic device having a frequency hopping transceiver and a collocated single frequency transceiver. Embodiments of the invention include a frequency hopping transceiver adapted to operate with at least two channel masks. A first channel mask includes frequency hopping channels available for wirelessly transmitting data from a transmitting electronic device which includes the frequency hopping system to a separate receiving electronic device. A second channel mask includes frequency hopping channels available for wirelessly receiving data sent from a receiving electronic device to the transmitting electronic device. Carrier frequencies included in the first channel mask are optionally selected to maintain a minimum preferred magnitude of separation between carrier frequencies used by the frequency hopping system and a selected carrier frequency used by the single frequency system in a transmitting electronic device. Carrier frequencies included in the second channel mask optionally correspond to a group of channels separated by a minimum preferred value from a carrier frequency used by the single frequency system in a receiving electronic device. Channel masks may optionally be arranged to include a minimum number of channels as required by some communication protocols.

Two or more electronic devices, each in accord with an embodiment of the invention, are able to communicate with each other using frequency hopping channels selected from the two channel masks without reducing a rate of data transfer for communications occurring simultaneously through the single frequency system in each electronic device. Embodiments of the invention may also be used to communicate efficiently with systems known in the art having a frequency hopping system with a single channel mask and optionally including a single frequency system. Embodiments of the invention are well suited for electronic devices used in applications in which it is undesirable for simultaneous single frequency and frequency hopping communications to cause a reduction in a rate of data communications through the single frequency system, for example, an application in which data exchanged between an electronic device and a peripheral such as a hand controller or headset should not interfere with data exchanged over a WLAN between the electronic device and another device such as an external computer system.

Figure 1:
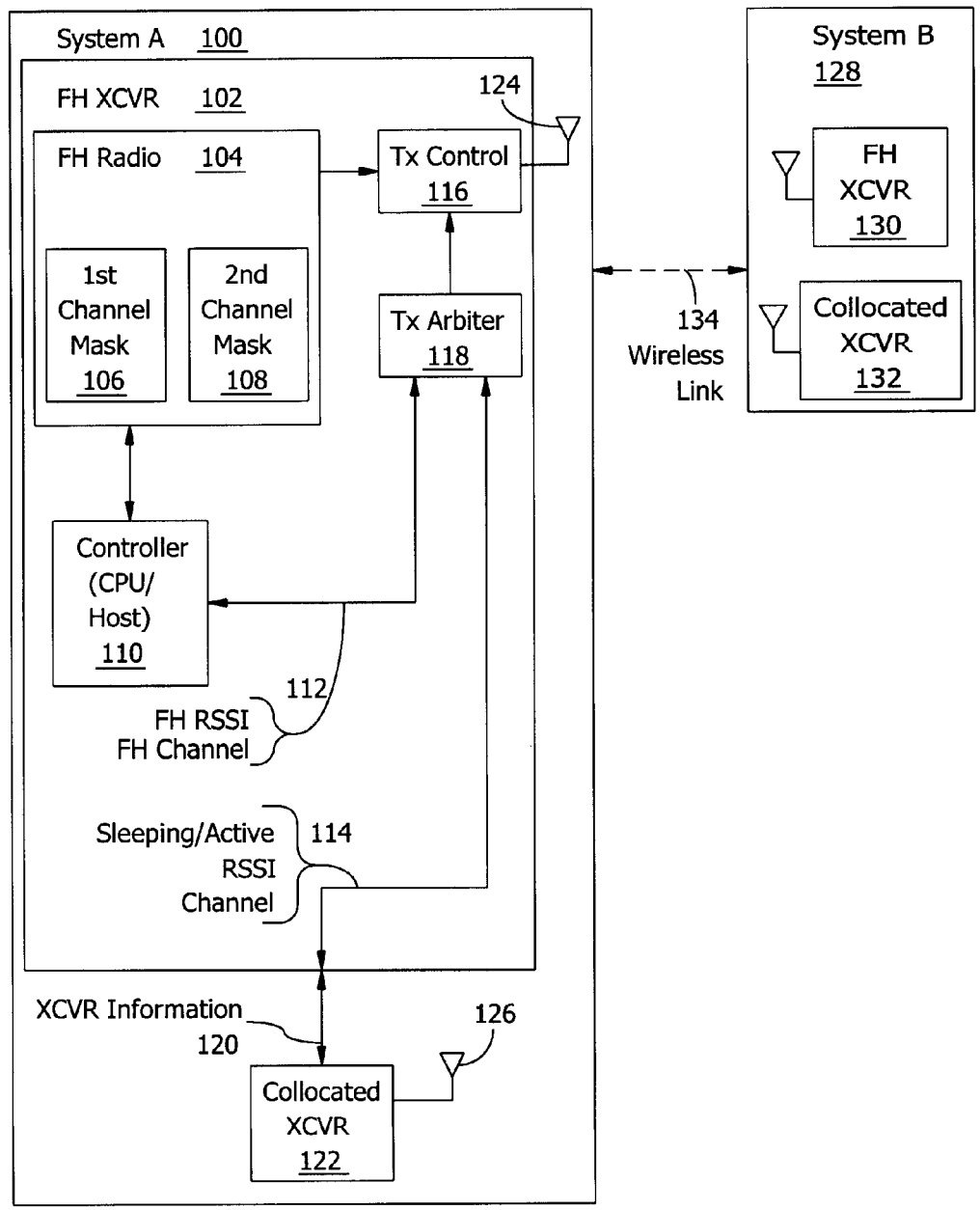
FIG. 1 is block diagram of two electronic systems adapted for wireless communication, in which System A is representative of an embodiment of the invention having a frequency hopping transceiver and a collocated single frequency transceiver, and System B alternately represents an embodiment of the invention or a frequency hopping system with collocated single frequency transceiver known in the art.

FIG. 1 shows a block diagram of two systems communicating wirelessly with each other. System A 100 is an example of an embodiment of the invention in which a frequency hopping (FH) transceiver (XCVR) 102 includes two channel masks (106, 108) and a single frequency transceiver (122) is collocated with the FH XCVR 102. One skilled in the art will appreciate that a collocated single frequency transceiver, referred to herein as a collocated transceiver 122, ordinarily operates on a single carrier frequency, but the carrier frequency may optionally be changed to establish communications with another system or to avoid or reduce radio frequency interference with another transmitter or receiver. A system A 100 in accord with an embodiment of the invention is also referred to herein as a frequency hopping system, a dual channel mask system, or a dual AFH system. System B 128, which has an FH XCVR 130 and a collocated XCVR 132, may alternately be a dual channel mask system or a system known in the art having only a single channel mask.

Two communications systems are considered to be collocated if both are located within a same electronic device. Two communications systems, for example a frequency hopping system and a collocated single frequency system, are considered to be operating simultaneously if a signal transmitted by one of the communication systems is received by, or alternately interferes with, the other communication system. A frequency hopping system in accord with an embodiment of the invention optionally operates in accord with a communications protocol, for example but not limited to the Bluetooth open wireless communications protocol as described in IEEE 802.15.1 and related publications. A collocated transceiver in accord with an embodiment of the invention, also referred to as a WLAN system for some embodiments, optionally operates in accord with a communications protocol, for example but not limited to one of the WLAN protocols described in IEEE 802.11, including 802.11b, 802.11g, and 802.11n.

As shown in the example of FIG. 1, a dual channel mask system 100 includes a frequency hopping (FH) XCVR 102 and a collocated XCVR 122 electrically interconnected by a plurality of XCVR information lines 120 carrying signals related to data to be transmitted over a WLAN and other signals related to WLAN status and operation. The collocated XCVR 122 optionally comprises, but is not limited to, a single frequency transceiver, a WLAN transceiver, a transmitter or transceiver for an analog or digital control signal, and other systems for sending and receiving signals with a significant fixed frequency component. XCVR information lines 120 include a group of lines 114 for carrying signals related to WLAN Sleeping/Active status, channel number, and Received Signal Strength Indication (RSSI), where RSSI refers to a measurement of an amount of power present in a received radio signal. Alternatively, XCVR information lines 120 are representative of data related to the collocated XCVR 122, for example data transferred from one software function to another, and optionally include numerical values corresponding to WLAN Sleeping/Active status, channel number, and RSSI.

The FH XCVR 102 of FIG. 1 includes an FH radio 104 having at least one pair of channel masks including a first channel mask 106 and a second channel mask 108. The first channel mask 106 may be implemented as a digital memory adapted to store data related to a set of frequency hopping channels for wirelessly sending data from a transmitting electronic device which includes the FH radio 104 to a separate receiving electronic device. The second channel mask 108 in the FH radio 104 is a digital memory adapted to store data related to a set of frequency hopping channels for wirelessly receiving data from a receiving electronic device which may optionally send data to the transmitting electronic device, for example data related to an acknowledgement or data related to an error condition. The first channel mask 106 is alternately referred to as a transmission mask 106. The second channel mask 108 is alternately referred to as a reception mask 108. A frequency hopping channel included in the transmission mask 106 or in the reception mask 108 may optionally be referred to as a BT channel, corresponding to one of the channels included in the Bluetooth open wireless communications protocol. A frequency hopping channel, for example a BT channel, may alternately be represented by channel number or by a related value of carrier frequency.

A controller 110 electrically connected to the frequency hopping radio 104 controls the frequency hopping radio 104 and outputs information related to the status of the frequency hopping radio. Information monitored by the controller 110, alternately referred to as a CPU/Host 110, includes, but is not limited to, RSSI and frequency hopping channel number. In some embodiments, the frequency hopping channel number corresponds to a BT channel. Signals related to RSSI and to the frequency hopping channel number are sent from the controller 110 to a transmit (Tx) arbiter 118 on a plurality of lines 112. The transmit arbiter 118 also receives signals related to WLAN Sleeping/Active status, Received Signal Strength Indication (RSSI), and channel number on lines 114 from the collocated XCVR 122. In other embodiments, different signals may be sent from the collocated XCVR 122 to the controller 110 and, as previously noted, lines 114 and 120 may be representative of data exchanged between software functions operating within the frequency hopping system 100. An output line from the transmit arbiter 118 is connected to an input of a transmit control 116. Another input of the transmit control 116 is connected to an output from the frequency hopping radio 104. The transmit control 116 has an output electrically connected to an antenna 124 for transmitting radio frequency signals.

The transmit arbiter 118 optionally determines when data to be transmitted by the frequency hopping radio 104 are output from the transmit control 116 to the antenna 124. For example, it is sometimes preferable to delay the transmission of data on a frequency hopping channel previously selected from the transmission mask 106 until a different frequency hopping channel number is selected. Alternatively, data may optionally be transmitted on a frequency hopping channel having a carrier frequency within a range of frequencies occupied by a WLAN channel if the controller 110 and transmit arbiter 118 have determined that data transmitted from the frequency hopping radio 104 is unlikely to interfere with data to be transmitted from or data to be received by the collocated transceiver 122 over its antenna 126.

Empirical testing of electronic devices having frequency hopping and collocated single frequency systems has shown that a rate of data communications through a channel used by the single frequency system, for example a WLAN channel, is not reduced by simultaneous frequency hopping communications if the carrier frequency of the WLAN channel is separated from the carrier frequencies of channels in a transmission mask by 30 MHz or more. Conversely, a separation of less than 30 MHz may cause some WLAN data packets to be retransmitted through the collocated transceiver, corresponding to a decrease in the rate of data communications through the WLAN channel. However, a reduction in a rate of data communication through a collocated transceiver resulting from a separation of less than 30 MHz may be acceptable for some applications. For example, a separation of at least 25 MHz between the collocated single frequency system's carrier frequency and the nearest channel in a channel mask increases a probability that a transmission by the FH system will interfere with a simultaneous transmission by the single frequency system, but for some applications a small loss in system response from occasional interference may be acceptable.

The width of a channel, for example the width of a frequency hopping channel or the width of a WLAN channel, refers herein to a difference in channel frequencies measured −20 dB from the peak amplitude of the channel's spectral mask. A magnitude of separation in frequency between two signals at different frequencies, for example a magnitude of separation in frequency between a frequency hopping channel and a WLAN channel, is measured at points that are −20 dB from the peak amplitudes of the two signals. A WLAN channel in accord with IEEE 802.11, for example WLAN channel 1, channel 6, or channel 11, has a width that is less than the combined widths of 20 BT channels, but the precise value of difference between the width of a WLAN channel and the width of 20 BT channels is not needed to understand how to make and use embodiments of the invention.

Embodiments of the invention preferably operate with a separation of 30 MHz or more between a channel used by a collocated single frequency system, for example WLAN channel 1, 6, or 11, and the channels in a channel mask. FIG. 2 shows an example of a channel mask and a WLAN channel which may be used by an embodiment of a dual AFH system. In FIG. 2, a range of carrier frequencies 200 in the ISM 2.4 GHz band are shown above a line 214 labeled with frequencies in MHz. Carrier frequencies 200 in the ISM 2.4 GHz band extend from 2400 MHz (2.400 GHz) to 2483.5 MHz (2.4835 GHz). A range of carrier frequencies 204 available for use by BT channels extends from 2402 MHz to 2480 MHz, corresponding to BT channel numbers 0 to 78 as indicated on a line 202 labeled with BT channel numbers.

A channel mask labeled Channel Mask 1 206 in FIG. 2 extends from 2402 MHz to 2432 MHz, corresponding to BT channels 0 to 30. A WLAN channel in an electronic device having a frequency hopping system and a collocated single frequency transceiver is represented by WLAN channel 11 208. WLAN channel 11 208 has a carrier frequency of 2462 MHz, shared with BT channel 60, and extends from 2452 MHz to 2472 MHz, corresponding to BT channels 50 to 70. The length of a line 212 from the carrier frequency for WLAN channel 11 208 to a channel in Channel Mask 1 206 is representative of a magnitude of frequency separation between the carrier frequency of a BT channel in Channel Mask 1 206 and the carrier frequency of the WLAN channel 208, and is referred to herein as a magnitude of BT-WLAN carrier frequency separation 212. FIG. 2 illustrates a magnitude of BT-WLAN carrier frequency separation of 30 MHz, corresponding to 30 BT channels.

FIG. 3 shows another example of a channel mask and a WLAN channel which may be used by an embodiment of a dual AFH system. A range of BT channel carrier frequencies 204 are shown in FIG. 3 for convenience in comparisons with other figures. A WLAN channel in an electronic device with a frequency hopping system and collocated single frequency system is represented by WLAN channel 6 302. WLAN channel 6 302 has a carrier frequency of 2437 MHz, shared with BT channel 35, and extends from 2427 MHz to 2447 MHz, corresponding to BT channels 25 to 45. A channel mask labeled Channel Mask 2 in FIG. 3 is separated into two segments. A first segment of Channel Mask 2 300A extends from 2402 MHz to 2407 MHz, corresponding to BT channels 0 to 5. A second segment of Channel Mask 2 300B extends from 2467 MHz to 2480 MHz, corresponding to BT channels 65 to 78.

FIG. 3 includes two lines 212, a first line 212 corresponding to a magnitude of BT-WLAN carrier frequency separation 212 between Channel Mask 2 300A and WLAN Channel 6 302, and a second line 212 corresponding to a magnitude of BT-WLAN carrier frequency separation 212 between Channel Mask 2 300B and WLAN Channel 6 302. FIG. 2 and FIG. 3 both illustrate a magnitude of BT-WLAN carrier frequency separation of 30 MHz, corresponding to 30 BT channels, with Channel Mask 2 (300A, 300B) shown in two segments in FIG. 3. Channel Mask 2 may be pictured as wrapping around from one end of the range of BT channels to the other end of the range of BT channels. In the example of FIG. 3, Channel Mask 2 (300A, 300B) includes fewer BT channels than Channel Mask 1 206 from FIG. 1, but a magnitude of BT-WLAN frequency separation 210 is the same in both figures. Channel mask 2 (300A, 300B) may optionally be modified to include a greater number of BT channels, but the resulting magnitude of BT-WLAN carrier frequency separation would be less than the magnitude of BT-WLAN carrier frequency separation 212 in the example of FIG. 2.

FIG. 2 and FIG. 3 may be used to illustrate properties of a dual AFH system. As a first example, a first electronic device, System A, is conducting communications with its collocated transceiver over a WLAN channel, for example WLAN channel 11. A second electronic device, System B, is also conducting communications with its collocated transceiver over WLAN channel 11, either with System A or with some other device. For purposes of this example, System A and System B are both dual AFH systems. While WLAN communications are being conducted by both System A and System B, the FH system in System A simultaneously transmits data to the FH system in System B. FIG. 1 is representative of two electronic devices corresponding to System A and System B, each with collocated FH and SF systems and within transmission and reception range of each other.

A dual AFH system uses two channel masks, a transmission mask and a reception mask, to conduct communications through an FH system without reducing a rate of data communication through a collocated transceiver. For two dual AFH systems communicating with each other, the transmission mask in the transmitting electronic device contains the same set of channels as the reception mask in the receiving electronic device, and the reception mask in the transmitting electronic device contains the same set of channels as the transmission mask in the receiving electronic device. In the current example, a transmission mask in System A includes the BT channels shown in channel mask 1 206 in FIG. 2. A reception mask in System A, which is maintained separately from the transmission mask, includes the same set of channels as the transmission mask because System A and System B are both dual AFH systems and both systems are using a same WLAN channel.

In the current example, the magnitude of BT-WLAN carrier frequency separation is 30 MHz for both System A 100 and System B 128. Systems A and B exchange information about their channel masks by conventional procedures, System A selects a channel for transmitting data from its transmission mask according to conventional AFH procedures, then System A transmits data over the selected channel to System B. Transmissions from System A to System B over System A's FH XCVR and transmissions from System B to System A over System B's FH XCVR will not reduce a rate of data communications over WLAN channel 11 in either System A or System B.

In the previous example, both System A and System B used WLAN channel 11. In a second example, both systems use WLAN channel 6. For this second example, the transmission masks and the reception masks in Systems A and B, both of which are dual AFH systems, include the BT channels shown in channel mask 2 (300A, 300B) in FIG. 3. In order to maintain a magnitude of BT-WLAN carrier frequency separation equal to 30 MHz, the total number of channels in the transmission mask (300A, 300B) is reduced (18 in FIG. 3 compared to 20 in FIG. 2).

Figure 4:
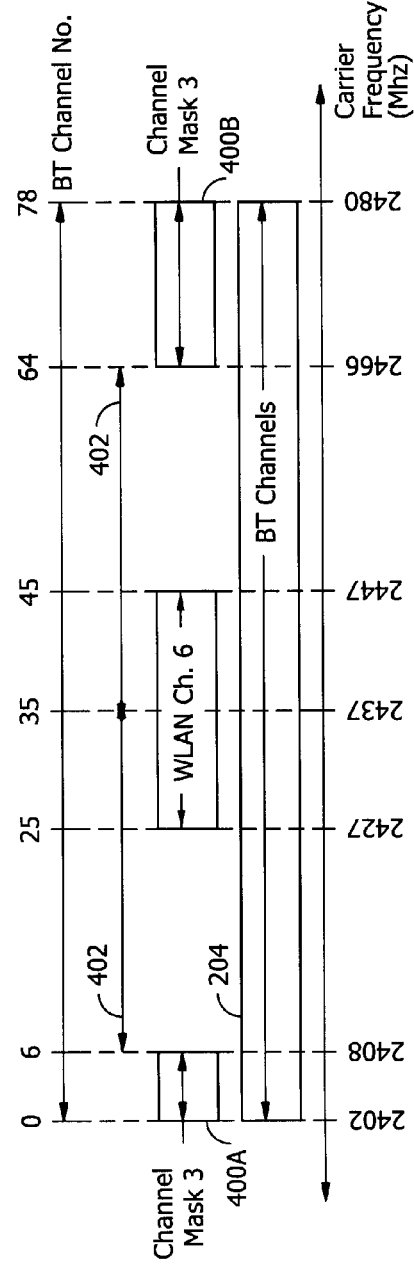
FIG. 4 is a diagram showing a third example of a channel mask and an example of reduced frequency separation between a channel mask and a WLAN channel, where the reduced frequency separation is a maximum achievable frequency separation.

In applications having a requirement for a minimum number of channels in a channel mask and the minimum number is greater than the number corresponding to a preferred value of BT-WLAN carrier frequency separation, the number of channels in the transmission mask and the number of channels in the reception mask would be increased to the minimum required number, and the magnitude of BT-WLAN carrier frequency separation would be reduced. FIG. 4 shows an example of a channel mask 3 (400A, 400B) having a magnitude of BT-WLAN carrier frequency separation 402 equal to 29 MHz, corresponding to 29 FH channels. Channel mask 3 (400A, 400B) may be representative of a transmission mask, a reception mask, or both, in a dual AFH system. The magnitude of BT-WLAN carrier frequency separation 402 in FIG. 4 is less than the value of 30 MHz in the example of FIG. 2 and FIG. 3, but the value of 29 MHz in FIG. 4 represents a maximum achievable magnitude of BT-WLAN carrier frequency separation compatible with the minimum number of channels in a channel mask.

In another example, dual AFH System A communicates over WLAN channel 6 and dual AFH System B communicates over WLAN channel 11. The transmission mask in System A corresponds to Channel Mask 2 (300A, 300B) in FIG. 3. The reception mask in System A corresponds to Channel Mask 1 206 in FIG. 2. The transmission mask in System B matches the reception mask in System A, and the reception mask in System B matches the transmission mask in System A. System A selects a channel for transmitting data from its transmission mask according to conventional procedures and transmits to System B. System B receives the transmitted data on a channel selected from its reception mask, the selected channel being the same channel used by System A for transmission. If System B transmits data to System A, System B selects a channel from its transmission mask, System A selects a channel from its reception mask, the two selected channels being the same, and System B transmits the data to System A.

In the previous example, both System A and System B are dual AFH systems. In another example, System A is a dual AFH system in accord with an embodiment of the invention, but System B is an electronic device having only a single channel mask, that is, System B is representative of a system known in the art. System A's transmission mask would be selected according techniques previously described for maintaining selected magnitudes of BT-WLAN carrier frequency separation. System A negotiates with System B to have channels from System A's transmission mask included in System B's only channel mask. System A's reception mask corresponds to System B's only channel mask. System B hops along its only channel mask in the conventional manner when it transmits data to System A. However, some of the channels in System B's channel mask may not be included in System A's transmission mask if System A determines that those channels are too close to System A's WLAN channel. System A would therefore transmit to System B only when Systems A and B both hop to a channel included in System A's transmission mask. When System A hops onto a channel included in its reception mask (corresponding to System B's only channel mask) but that is not included in System A's transmission mask, System A optionally defers transmission until another channel number is selected. However, System A's FH XCVR may optionally transmit to System B if System A determines that its collocated XCVR is inactive.

Some embodiments of a dual AFH system optionally include more than one transmission mask and more than one reception mask. A configuration with more than one transmission mask and more than one reception mask enables an electronic device in accord with an embodiment of the invention to communicate simultaneously with more than one external wireless-enabled device. An example of an embodiment of the invention adapted for communication with more than one external device is shown in FIG. 6.

Figure 6:
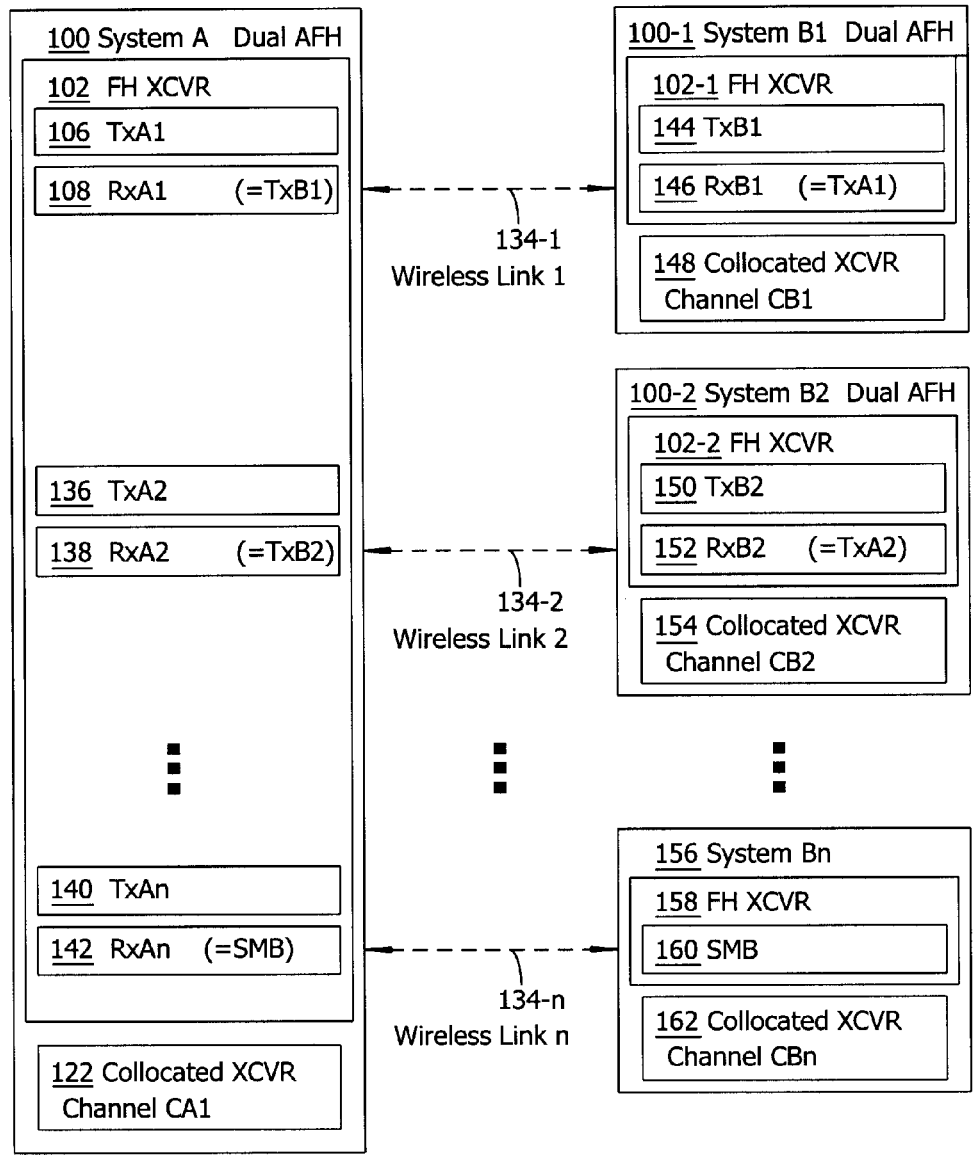
FIG. 6 is a block diagram of a dual AFH system in wireless communication with a plurality of other frequency hopping systems, where each of the other frequency hopping systems may be either a dual AFH system or a frequency hopping system known in the art.

In the example of FIG. 6, a dual AFH system 100, labeled System A 100, includes a frequency hopping transceiver FH XCVR 102 and a collocated transceiver 122. Collocated transceiver 122 operates on a single carrier frequency represented as channel number CA1 in the figure. As shown in FIG. 6, dual AFH System A 100 is communicating with a plurality of other external systems over wireless links, represented by dual AFH System B1 100-1 and associated wireless link 1 134-1, dual AFH system B2 100-2 and associated wireless link 2 134-2, and system number "n", represented by System Bn 156 and associated wireless link number "n" 134-*n*. Dual AFH system B1 100-1 includes an FH XCVR 102-1 and a collocated XCVR 148 operating on channel number CB1. Dual AFH system B2 100-2 includes an FH XCVR 100-2 and a collocated XCVR 154 operating on channel number CB2. System Bn 156 includes a collocated XCVR 162 operating on channel CBn. Channels CB1, CB2, . . . , CBn may alternatively all be the same channel, all different channels, or some channels the same and some different in any combination.

As shown in FIG. 6, dual AFH System A 100 optionally includes "n" pairs of channel masks, each pair comprising a transmission mask and a reception mask for each of "n" number of wireless links. Transmission mask TxA1 106 and reception mask RxA1 108 in System A 100 include BT channels used for communication with dual AFH system B1 100-1. Transmission mask TxA2 136 and reception mask RxA2 138 include BT channels used for communication with dual AFH system B2 100-2. The "nth" pair of channel masks in System A 100 include transmission mask TxAn 140 and reception mask RxAn 142 for communication with system Bn 156.

Dual AFH systems B1 100-1 and B2 100-2 each include a pair of channel masks for communicating with System A 100. FH XCVR 102-1 in dual AFH system B1 100-1 includes transmission mask TxB1 144 and reception mask RxB1 146. FH XCVR 102-2 in dual AFH system B2 100-2 includes transmission mask TxB2 150 and reception mask RxB2 152. Dual AFH System A 100 and dual AFH System B1 negotiate the contents of their channel masks as described in previous examples for communication between two dual AFH systems. After negotiations are complete, RxA1 108 includes the same list of channels as TxB1 144 and RxB1 146 includes the same list of channels as TxA1 106. System A 100 and System B2 100-2 similarly negotiate the contents of their channel masks, after which RxA2 138 includes the same list of channels as TxB2 150 and RxB2 152 includes the same list of channels as TxA2 136.

In FIG. 6, System Bn 156 is shown with a single channel mask SMB 160 in FH XCVR 158. System Bn 156 is representative of frequency hopping systems known in the art. Dual AFH system A 100 assigns channels to transmission mask TxAn 140 as described in previous examples. Dual AFH system A negotiates with System Bn 156 to have channels in TxAn 140 included in SMB 160. Channel mask SMB 160 may include channels which are not included in TxAn 140. After negotiation, reception mask RxAn 142 includes the same list of channels as in SMB 160. System A 100 is therefore able to hop to a same channel in RxAn 142 as System Bn 156 hops to in SMB 160 for the purpose of receiving data from System Bn 156. However, System Bn 156 may hop to a channel in SMB 160 which is not included in TxAn 140, in which case System A 100 optionally defers transmission until another channel in the hop sequence is included in TxAn 140.

Figure 5:
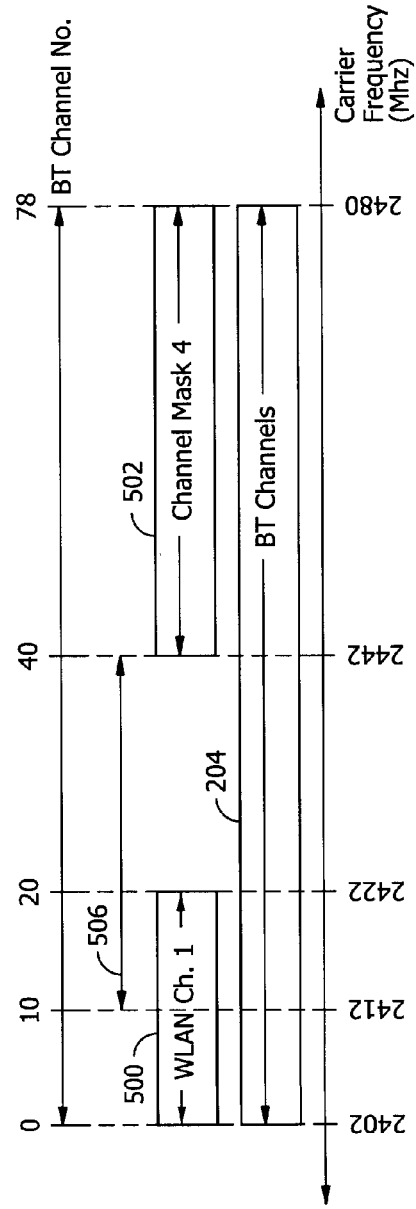
FIG. 5 is a diagram showing a fourth example of a channel mask and WLAN channel 1, which may be used with an embodiment of the invention.

WLAN channel 1 and a new channel mask could be substituted for the WLAN channels and channel masks in any of the previous examples. As shown in FIG. 5, WLAN channel 1 500 has a carrier frequency of 2412 MHz, corresponding to BT channel 10, and extends from 2402 MHz to 2422 MHz, corresponding to BT channels 0 to 20. Channel mask 4 502, another example of a channel mask in accord with an embodiment of the invention, extends from BT channel 40 at 2442 MHz to BT channel 78 at 2480 MHz. In the example of FIG. 5, the magnitude of BT-WLAN carrier frequency separation is 30 MHz. In an embodiment of the invention, channel mask 4 is representative of a transmission mask, a reception mask, or could represent both kinds of masks. Similarly, in any of the previous examples, channel mask 1 206, channel mask 2 (300A, 300B), and channel mask 3 (400A, 400B) are optionally representative of a transmission mask, a reception mask, or represent both kinds of masks if both the transmitting electronic device and receiving electronic device are dual AFH systems.

Steps in a method in accord with an embodiment of the invention are shown in FIGS. 7A-7D. In the example of FIGS. 7A-7D, a reference to Dual AFH System A, or alternately System A, refers to an embodiment of the invention. A reference to external System B, or alternately System B, refers to an external system which may alternately be an embodiment of the invention or a system known in the art, depending on which part of the method is being performed.

In the example of FIGS. 7A-7D, System A may be referred to by one skilled in the art as a "master" system and System B as a "slave" system because System A is shown as initiating the steps in the illustrated example. However, the steps in the illustrated method are essentially the same when the roles of System A and System B are reversed, that is, System A is a slave system and only transmits after System B sends data to System A, as may occur, for example, when System B is a single channel mask system and also the master system.

A method 600 for dual adaptive frequency hopping begins at step 602 in FIG. 7A and proceeds with step 604 for reserving a memory areas for variables related to operation of System A, including transmission mask TxA, reception mask RxA, WLAN channel number, WLAN carrier frequency and related BT channel number, and WLAN frequency range from a minimum frequency value and related BT channel number to a maximum frequency value and related BT channel number. A WLAN frequency range may optionally be selected to be in accord with a range of frequencies from a communications protocol.

The method of FIG. 7A continues at step 606 with selection of a preferred value for a magnitude of BT-WLAN carrier frequency separation, as described by a line 212 in FIG. 2 and elsewhere herein. Next, in step 608, a minimum number of channels in a channel mask is assigned. The minimum number of channels in a channel mask may optionally be applied to a transmission mask, a reception mask, or to the total number of channels in both masks. A minimum number of channels in a channel mask may optionally be related to a requirement in a communication protocol.

In step 610, a plurality of BT channel numbers are assigned to transmission mask TxA such that a magnitude of difference between the WLAN carrier frequency and the carrier frequency for each BT channel included in TxA is greater than or equal to the preferred value of BT-WLAN carrier frequency separation selected in step 606. TxA optionally includes more than the minimum number of channels selected in step 608.

After TxA is defined in step 610, in step 612 System A receives identifying information from an external system B. The identifying information includes data which indicates if System B is a dual AFH system or a single channel mask system. In step 614, the data received in step 612 is used to determine if System B is a dual AFH system. If System B is a dual AFH system, steps in the method proceed with step 616 in FIG. 7B. If System B is not a dual AFH system, that is, System B is a single channel mask system, steps in the method proceed with step 630 in FIG. 7C.

Figure 7B:
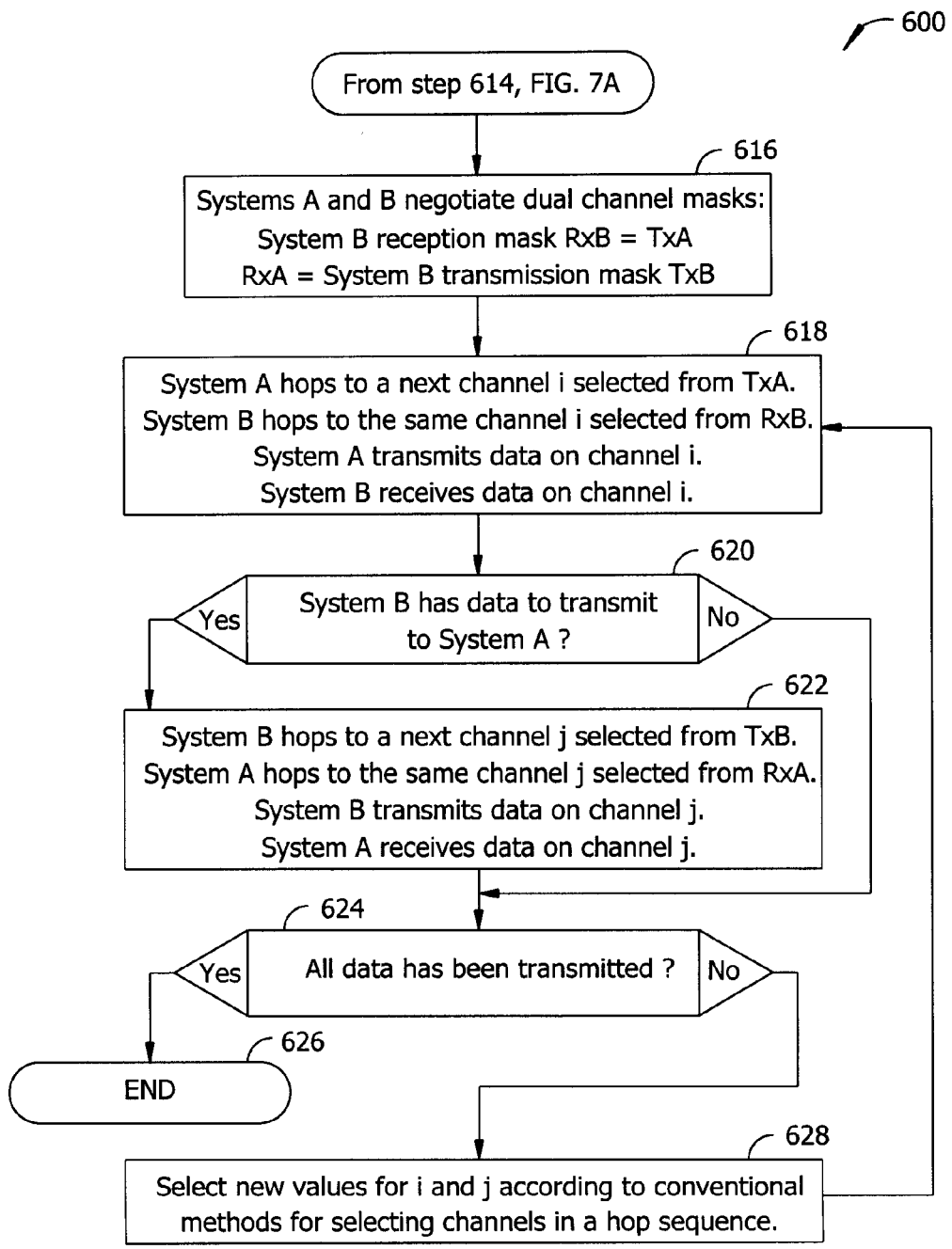

If System A determines that System B is a dual AFH system, the method of FIGS. 7A-7D continues at step 616 in FIG. 7B with System A and System B negotiating the channels to be included in channel masks in each system. After negotiation is completed, reception mask RxA in System A and transmission mask TxB in system B include a same list of BT channels, and transmission mask TxA in System A and reception mask RxB in System B include a same list of BT channels.

After step 616, assignment of channel numbers to transmission and reception masks in Systems A and B is complete. Next, in step 618 System A hops to a next channel number "i" selected from TxA. System B hops to the next channel selected from RxB, which will also be channel number "i". System A then transmits data on channel number "i" and System B receives the data transmitted from System A on channel number "i".

After transmitting data to System B, System A then determines in step 620 if System B has data to transmit to System A. Such a determination by System A may include, for example, a signal received from System B, or be a required step in a communication protocol. If System A determines that System B does not have data to transmit, the method continues at step 624, described below. If System A determines that System B has data to transmit, the method continues at step 622 with System B hopping to a next channel number "j" selected from TxB, System A hopping to a next channel in RxA which will also be channel number "j", transmission of data on channel number "j" by System B, and reception of data on channel number "j" by System A.

After System B transmits data to System A in step 622, System A determines in step 624 of FIG. 7B if data exchange between Systems A and B is complete. If all data has been transmitted, steps in the example of a method end at step 626. If data remains to be transmitted, new values for "i" and "j" are selected according to conventional methods for selecting channels in a hop sequence, as shown in step 628, and the method returns to step 618 to continue with data transmission. A method for selecting "i" and "j" may optionally be in accord with a communications protocol.

Returning to step 614 in FIG. 7A, if System A determines that System B is not a dual AFH system, steps in the example of a method continue at step 630 in FIG. 7C. System A enters step 630 in FIG. 7C after having determined that System B is a single channel mask system representative of frequency hopping systems known in the art. In step 630, System A receives data corresponding to channels included in System B's single channel mask, SMB. Next, in step 632, System A finalizes a shared mask including TxA from System A and SMB from System B and transmits the shared channel mask to System B. System B stores the shared channel mask in SMB, replacing the earlier contents of SMB, and System A stores the shared channel mask in RxA, as shown in step 634 in FIG. 7C.

After step 634, channel masks in Systems A and B are complete. Next, in step 636, System B hops to a next channel number "m" selected from its single channel mask SMB and System A hops to a next channel selected from its reception mask RxA, which will also be channel number "m". Then, in step 638, System A determines if channel number "m" is one of the channels included in System A's transmission mask TxA.

If channel number "m" is found in step 638 to be a member of the list of channels included in TxA, then in step 640 System A transmits data on channel number "m" and System B receives the data transmitted from System A on channel number "m". The method then continues at step 644 in FIG. 7D. If, however, at step 638 channel number "m" is not found to be included in the list of channels in TxA, System A determines in step 639 if the WLAN is active. If the WLAN is active, for example data is being sent or received over a WLAN channel, System A defers data transmission as shown at step 642 in FIG. 7C. If at step 639 the WLAN is inactive, System A may optionally transmit data on channel number "m". The method continues at step 652 in FIG. 7D, where new values for "m" and "n" are selected according to conventional methods for selecting channels in a hop sequence. After new values for "m" and "n" are selected in step 652, the method returns to step 636 in FIG. 7C.

Figure 7D:
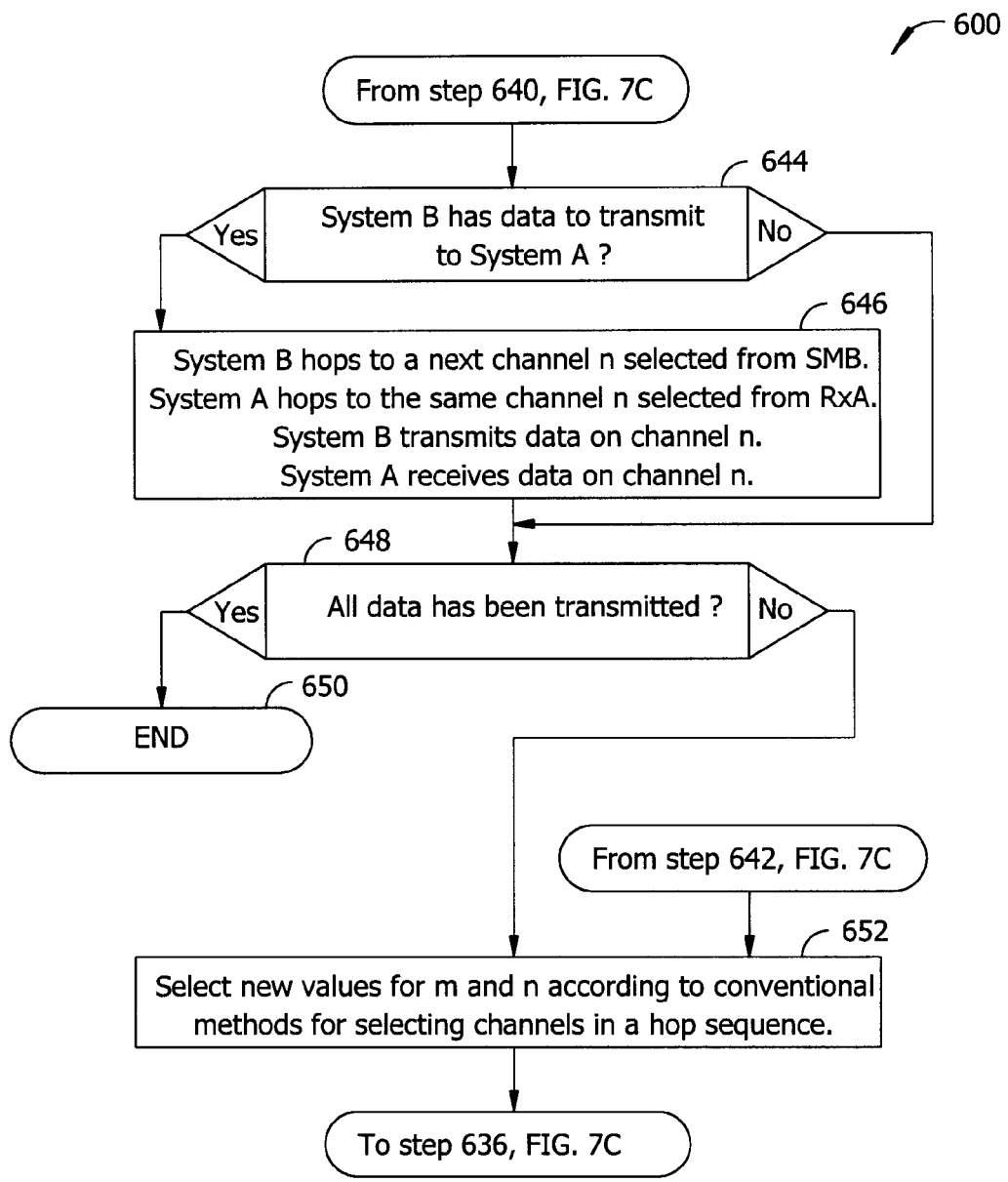

After System A transmits data to System B on channel number "m" as shown in step 640, System A determines if System B has data to transmit to System A as in step 644 in FIG. 7D. If System B has data to transmit to System A, then in step 646, System B hops to a next channel number "n" selected from its single channel mask SMB, System A hops to a next channel selected from RxA, which will also be channel number "n", System B transmits data on channel number "n", and System A receives data from System B on channel number "n", as shown in step 646.

Next, in step 648 in FIG. 7D, System A determines if all data has been transmitted between System A and System B. If System A determines in step 648 that all data has been transmitted, steps in the example of a method of FIGS. 7A-7D end at step 650. If instead System A determines in step 648 that data remains to be transmitted, the method continues at step 652, where new values for "m" and "n" are selected as earlier described.

It may not be possible to satisfy a requirement for a minimum number of channels in a channel mask while maintaining a minimum magnitude of BT-WLAN carrier frequency separation for all of the channels in the channel mask. For example, FIG. 4 illustrates a situation in which the magnitude of BT-WLAN carrier frequency separation is reduced from 30 MHz to 29 MHz in order to form a channel mask (channel mask 3, 400A and 400B) having at least 20 channels as required in some communication protocols. In such as case, step 610 in FIG. 7A may optionally include the additional steps of iteratively decrementing the preferred value of BT-WLAN carrier separation until the number of channels in a channel mask is greater than or equal to a selected minimum number of channels in a channel mask.

Unless expressly stated otherwise herein, ordinary terms have their corresponding ordinary meanings within the respective contexts of their presentations, and ordinary terms of art have their corresponding regular meanings.

What is claimed is:

1. A system for adaptive frequency hopping, comprising:
a frequency hopping transceiver having a plurality of channel masks, wherein the plurality of channel masks comprise a transmission mask having a plurality of values representative of a set of frequency hopping channels for wireless transmission of data and, the plurality of channel masks comprise a reception mask having a plurality of values representative of a set of frequency hopping channels for wireless reception of data; and
a collocated single frequency transceiver having a first selected value of carrier frequency, wherein a magnitude of frequency difference between said first selected value of carrier frequency and at least one frequency hopping channel in the set of frequency hopping channels in said transmission mask is greater than or equal to a selected magnitude of frequency separation.

2. The system for adaptive frequency hopping of claim 1, wherein the magnitude of frequency difference between said first selected value of carrier frequency and each frequency hopping channel in the set of frequency hopping channels in said transmission mask is greater than or equal to said selected magnitude of frequency separation.

3. The system for adaptive frequency hopping of claim 2, wherein said first selected value of carrier frequency corresponds to a WLAN channel number and said frequency hopping channels correspond to channels included in the Bluetooth open wireless communications protocol.

4. The system for adaptive frequency hopping of claim 2, wherein data transmission is optionally deferred when a channel selected from said reception mask, corresponding to a channel in use by an external system for receiving data, is not included in said transmission mask.

5. The system for adaptive frequency hopping of claim 1, wherein pairs of said plurality of channel masks is associated with a wireless link to a different external wireless-enabled system.

6. The system for adaptive frequency hopping of claim 5, further comprising an electronic device including said frequency hopping transceiver and said collocated single frequency transceiver.

7. A method for adaptive frequency hopping, the method comprising:
- determining a transmission mask and a reception mask in a frequency hopping transceiver in an electronic device with a collocated single frequency transceiver;
- selecting a carrier frequency for the collocated single frequency transceiver for sending and receiving data;
- determining a selected set of frequency hopping channels for use in adaptive frequency hopping radio transmission in the transmission mask;
- determining a selected set of frequency hopping channels for use in adaptive frequency hopping radio reception in the reception mask;
- selecting a channel from the transmission mask and sending data to an external wireless-enabled device on the channel selected from the transmission mask;
- selecting a channel from the reception mask and receiving data from an external wireless-enabled device on the channel selected from the reception mask;
- selecting a value for a magnitude of frequency separation between the carrier frequency for the collocated single frequency transceiver and frequency hopping channels in the transmission mask; and
- assigning frequency hopping channels to the transmission mask such that at least one channel is separated from the selected carrier frequency for the collocated single frequency transceiver by an amount greater than or equal to the selected value for the magnitude of frequency separation.

8. The method for adaptive frequency hopping of claim 7, further comprising:
- assigning frequency hopping channels to the transmission mask such that each channel is separated from the selected carrier frequency for the collocated single frequency transceiver by an amount greater than or equal to the selected value for the magnitude of frequency separation.

9. The method for adaptive frequency hopping of claim 8, further comprising:
- receiving identifying information from the external wireless-enabled device; and
- determining from the identifying information which one of the following conditions is true:
  - condition 1: the external wireless-enabled device is a dual adaptive frequency hopping (dual AFH) system; or
  - condition 2: the external wireless-enabled device is a single channel mask system.

10. The method for adaptive frequency hopping of claim 9, further comprising:
- in response to condition 1 being true,
  - negotiating dual channel masks with the external wireless-enabled device;
  - assigning the selected set of frequency hopping channels in the transmission mask to the external wireless-enabled device's reception mask; and
  - assigning a set of channels from the external wireless-enabled device's transmission mask to the reception mask.

11. The method for adaptive frequency hopping of claim 10, further comprising:
- in response to condition 2 being true,
  - negotiating a shared channel mask comprising the selected set of frequency hopping channels from the transmission mask and channels from the single channel mask in the external wireless-enabled device;
  - assigning the channels in the shared channel mask to the reception mask; and
  - transmitting the shared channel mask to the external wireless-enabled device.

12. The method for adaptive frequency hopping of claim 11, further comprising:
- in response to condition 2 being true,
  - hopping to a channel selected from the reception mask;
  - determining if the channel selected from the reception mask is included in the transmission mask; and
  - if the channel selected from the reception mask is not included in the transmission mask, deferring data transmission.

13. The method for adaptive frequency hopping of claim 12, further comprising determining more than one pair of channel masks, wherein each pair of channel masks includes a transmission mask and a reception mask for wireless communication with a separate external wireless-enabled device.

14. The method for adaptive frequency hopping of claim 12, wherein the deferring data transmission occurs in response to said collocated single frequency transceiver being active.

* * * * *